US 6,598,574 B2

United States Patent
Osada et al.

(10) Patent No.: US 6,598,574 B2
(45) Date of Patent: Jul. 29, 2003

(54) CURRENT SUPPLY CIRCUIT FOR ENGINE STARTERS

(75) Inventors: Masahiko Osada, Okazaki (JP); Mikio Saito, Motosu-gun (JP); Masahiro Katoh, Chiryu (JP)

(73) Assignee: Denso Corporation, Kariya (JP)

( * ) Notice: Subject to any disclaimer, the term of this patent is extended or adjusted under 35 U.S.C. 154(b) by 72 days.

(21) Appl. No.: 09/922,689

(22) Filed: Aug. 7, 2001

(65) Prior Publication Data
US 2002/0023605 A1 Feb. 28, 2002

(30) Foreign Application Priority Data

Aug. 30, 2000 (JP) ........................... 2000-261280
May 10, 2001 (JP) ........................... 2001-139993

(51) Int. Cl.⁷ ............................................. F02N 11/09
(52) U.S. Cl. .................................. 123/179.1; 290/38 R
(58) Field of Search ..................... 123/179.1, 179.3, 123/179.4; 290/38 R, 38 C, 38 E

(56) References Cited

U.S. PATENT DOCUMENTS 5,525,943 A      6/1996   Roethlingshoefer et al.
2000/6020650     *  2/2000 Soh .......................... 290/38 R

FOREIGN PATENT DOCUMENTS

JP               5-299873              11/1993

* cited by examiner

Primary Examiner—Henry C. Yuen
(74) Attorney, Agent, or Firm—Oliff & Berridge, PLC

(57) ABSTRACT

In a current supply circuit for starters, an inductance coil is connected in series or a capacitor is connected in parallel with a starter motor to slow down the rise of a current supplied to the starter motor. The current, which flows in a magnet switch upon occurrence of bouncing of the magnet switch, is lowered. Thus even if the time of occurrence of bouncing delays due to increased inductance of a pull-in coil, the magnet switch turns on and off a small current by bouncing and hence generation of noise arising from bouncing can be suppressed. Generation of arc in the magnet switch due to bouncing can be suppressed, and the reliability of the magnet switch can be increased.

6 Claims, 3 Drawing Sheets

CURRENT SUPPLY CIRCUIT FOR ENGINE STARTERS

CROSS REFERENCE TO RELATED APPLICATION

This application is based on and incorporates herein by reference Japanese Patent Applications No. 2000-261280 filed Aug. 30, 2000 and No. 2001-139993 filed May 10, 2001.

BACKGROUND OF THE INVENTION

The present invention relates to a current supply circuit for starters which drive engines.

In conventional vehicles, a starter drives an engine until the engine operates with air-fuel mixture combustion. The engine operation is maintained in the idling condition when the vehicle is at rest at traffic lights. An economy running system is increasingly used in recent years to stop the engine when the vehicle is at rest at the traffic lights, so that fuel economy and exhaust emission are improved.

In the economy running system, a radio and other electric devices are very often in operation when the starter automatically re-starts the engine in the vehicle rest condition at traffic lights. The starter is subjected to a large load at the initial stage of driving the starter, because the engine has a large stationary inertia. The current increases excessively as shown by the solid line A in FIG. 2. As a result, when the starter is re-started from the vehicle rest condition, an excessive current flows at the initial stage and influence the radio and other electric devices in operation at that time.

Further, in case a starter is designed to operate with higher voltage, the number of turns of the pull-in coil of a magnet switch, which controls the current supply to the starter motor, increases resulting in an increase in the inductance of the pull-in coil of the magnet switch. This causes delay in turn-on time of the magnet switch.

When the magnet switch turns on, a movable contact crashes a fixed contact and bounces. However, the bouncing occurs with a time delay due to increase in the inductance of the pull-in coil of the magnet switch. If the starter is not a high voltage type, the inductance of the pull-in coil of the magnet switch is low. As a result, the magnet switch turns on quickly and bouncing occurs at position α in FIG. 3. However, if the starter is designed to operate with high voltage, the turn-on time of the magnet switch delays and bouncing occurs at position β in FIG. 3.

When the time of bounce delays as shown by β, the magnet switch turns on and off the large current by bouncing causing generation of electric arc at contact terminals of the magnet switch. This arc generates noise and causes melting of the contact terminals, resulting in low reliability of the magnet switch.

SUMMARY OF THE INVENTION

It is therefore an object of the present invention to reduce a current supplied when driving a starter is initiated, so that reliability of a magnet switch is improved and noise generated upon bouncing is reduced.

According to the present invention, a current supply circuit for starters comprises a starter motor for starting an engine, a magnet switch for turning on and off a current supplied to the starter motor, and a rise slow-down device for slowing down a speed of rise of the current supplied to the starter motor.

The rise slow-down device may be an inductance coil connected in series with the starter motor and slows down the speed of rise of the current by inductance of the inductance coil. The rise slow-down device may alternatively a capacitor connected in parallel with the starter motor and slows down the speed of rise of the current by capacitance of the capacitor. Preferably, a time period required for the current to attain a peak when the current supplied to the starter motor is slowed down satisfies $T \leq (10/12)V$, in which T indicates the time period and V indicating a driving voltage for the starter motor.

BRIEF DESCRIPTION OF THE DRAWINGS

The above and other objects, features and advantages of the present invention will become more apparent from the detailed description made with reference to accompanying drawings. In the drawings.

DETAILED DESCRIPTION OF THE PREFERRED EMBODIMENT

Figure 1:
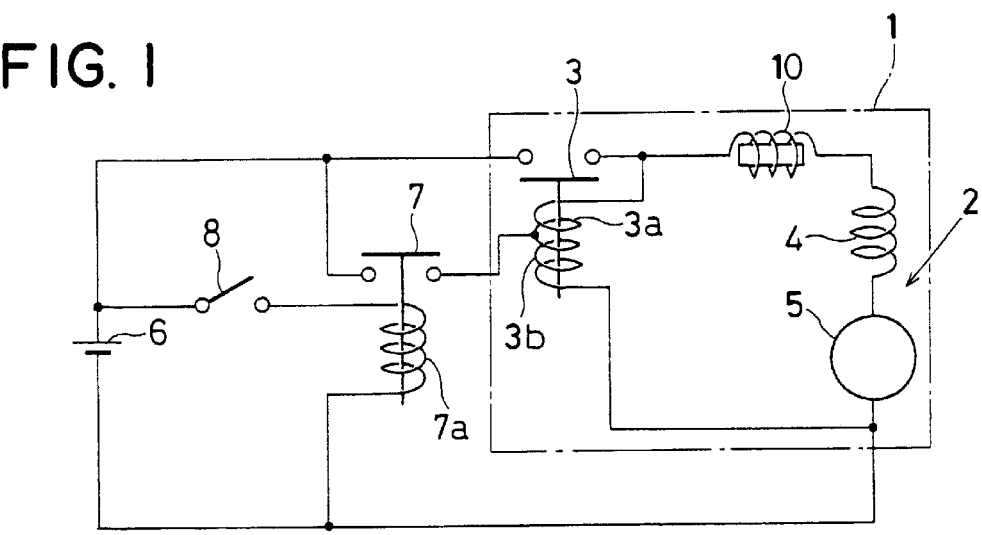
FIG. 1 is a circuit diagram of a current supply circuit for starters according to a first embodiment of the present invention.

The present invention is described with reference to various embodiments and variations, in which the same or similar parts are designated with the same or similar reference numerals.

First Embodiment

Referring to FIG. 1, a starter 1 has a starter motor 2 for driving an engine and a magnet switch 3 for turning on and off the current supply to the starter motor 2. The starter motor 2 has an armature 4 including an armature coil (not shown) and a direct-wound field coil 5 connected in series with the armature 4. The starter motor 2 is a known type, which generates a rotating torque for starting the engine when a current is supplied from a vehicle-mounted battery 6 through the magnet switch 3.

A pull-in coil (attraction coil) 3a and a holding coil 3b of the magnet switch 3 are connected to the battery 6 through a starter relay 7. A relay coil 7a of the starter relay 7 is connected to the battery 6 through a key switch 8.

When the key switch 8 is turned on, that is, the key switch 8 is turned to a starter position, the relay coil 7a of the starter relay 7 is supplied with a current. The starter relay 7, which has a normally-open movable contact, turns on. The pull-in coil 3a and the holding coil 3b of the magnet switch 3 are supplied with the current. Then the magnet switch 3, which has a normally-open movable contact, turns on. A large current flows in the starter motor 2 and drives the engine to rotate.

In the starter 1, an inductance coil 10 is connected in series with the starter motor 2 (armature 4 and the field coil 5). This inductance coil 10 operates to slow down the speed of rise of the current supplied to the starter motor 2. This inductance coil 10 reduces a rate of rise of the current supplied to the starter motor 2 by its inductance.

In this embodiment, when the key switch 8 is turned to the starter position to start the engine, the starter relay 7 turns on to supply the current to the pull-in coil 3a and the holding coil 3b therethrough. The current is first supplied to the starter motor 2 through the pull-in coil 3a and the inductance coil 10, because the pull-in coil 3a is connected in series with the inductance coil 10. The movable contact of the magnet switch 3 subsequently fully contacts the switch terminals (fixed contact). As a result a large current flows from the battery 6 to the starter motor 2 through the inductance coil 10, bypassing the pull-in coil 3a.

If the inductance of the pull-in coil 3a is large because the starter 1 is designed to operate with a large voltage, the turn-on time of the magnet switch 3 delays by an increase in the inductance at the initial stage of driving the starter. In the conventional current supply circuit, bouncing occurs (position α in FIG. 3) by the turn-on of the magnet switch 3 when the rush current determined by the electric time constant of the starter 1 increases.

Figure 3:
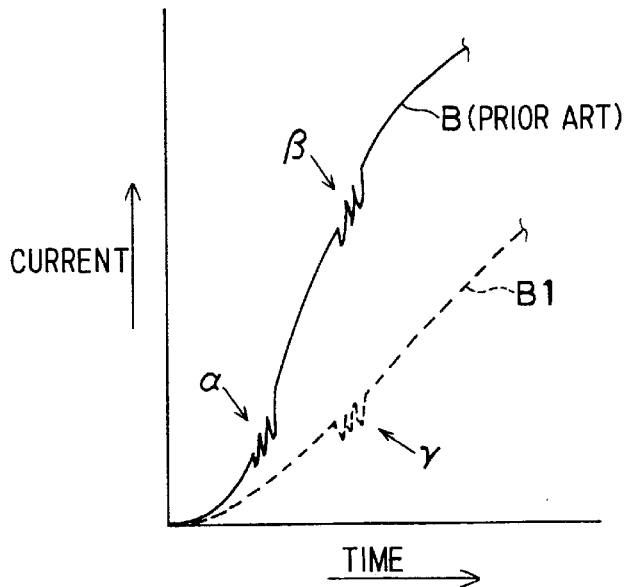
FIG. 3 is a graph showing a position of occurrence of bouncing in the starter in the first embodiment and in the prior art starter.

However, according to the first embodiment, the inductance coil 10 is connected in series with the starter motor 2 to slow down the speed of rise of the rush current as shown by the dotted line B1 in FIG. 3. The current flowing in the magnet switch 3 is held low at the time the bouncing occurs (position γ in FIG. 3).

Thus, even when occurrence of bouncing delays due to high inductance of the pull-in coil 3a, the magnet switch 3 turns on and off small current by bouncing as shown at position γ in FIG. 3. As a result, generation of arc at the contact terminals of the magnet switch 3 is suppressed, and noise generated by bouncing is reduced. The inductance coil 10 absorbs the generated noise, thus reducing noise generated by the magnet switch 3.

Further, because generation of arc due to bouncing at the contact terminals of the magnet switch 3 is suppressed, the switch contacts are protected from melting and being damaged resulting in improvement in the reliability of the magnet switch 3.

Figure 2:
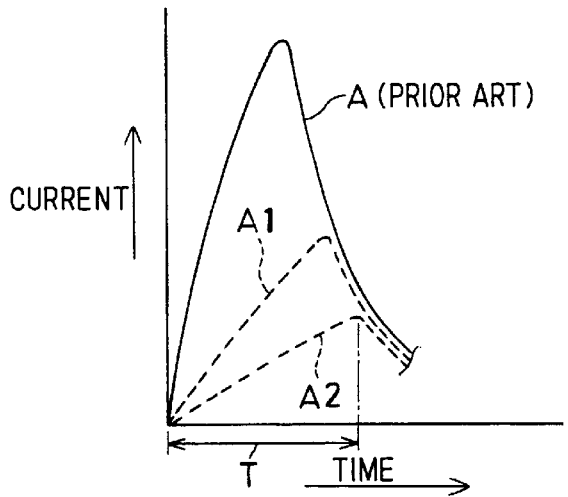
FIG. 2 is a graph showing a peak current supplied to a starter in the first embodiment and in the prior art starter.

In addition, the starter 1 is subjected to excessive load at the initial stage of the starter 1, because it drives the engine, which has a large stationary inertia. A peak current due to the rush current and the counter electromotive force is generated. However, the speed of rise of the rush current is slowed down as shown by dotted lines A1 and A2 in FIG. 2 by connecting the inductance coil 10 in series with the starter motor 2. Thus, the current at the initial stage of driving the starter 1 can be reduced.

The inductance of the inductance coil 10 is set in correspondence with the inductance of the pull-in coil 3a, which corresponds to the coil of the magnet switch 3. That is, the time period for slowing down the speed of rise of the current supplied to the starter motor 2 is set longer as the inductance of the pull-in coil 3a increases. Specifically, the inductance of the inductance coil 10 is set to slow down the speed of rise of the rush current, as the inductance of the pull-in coil 3a increases.

Appropriate values for slowing down the rise of the current by the inductance coil 10 are determined as follows.

The inductance of the inductance coil 10 in this embodiment is determined to a value, which satisfies the equation, $T \leq (10/12)V$. Here, the time period from the start of current supply to the starter motor 2 to the rise of the current to the peak value is represented by T msec (FIG. 2), and the starter driving voltage is represented by V.

In this embodiment in which the starter motor driving voltage is the vehicle-mounted battery 6, the inductance is set so that the time period T required for the current to rise to the peak becomes less than 10 msec if the voltage of the vehicle-mounted battery 6 is 12 V.

The value of current which flows in the magnet switch 3 at the time of occurrence of bounce can be reduced by this setting, even when the starter motor driving voltage increases. The magnet switch 3 turns on and off small current by bouncing. As a result, generation of arc at the terminals of the magnet switch 3 is suppressed irrespective of the magnitude of the starter motor driving voltage. The terminals are protected from melting and being damaged, thus resulting in improving the reliability of the magnet switch 3. Further noise arising from bouncing is suppressed.

Second Embodiment

Figure 4A:
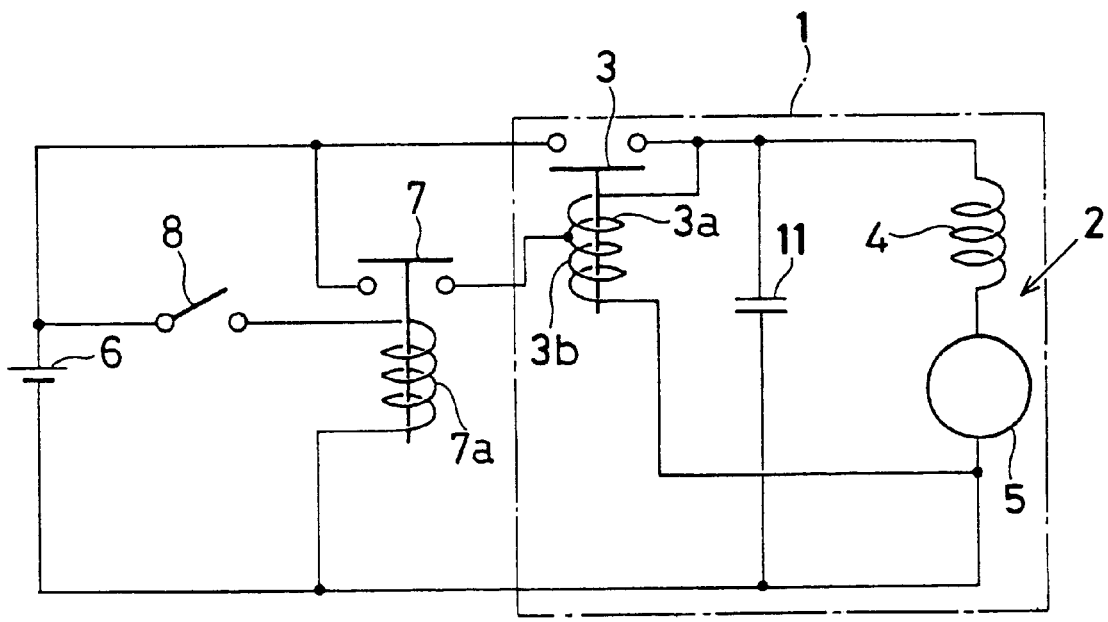
FIGS. 4A and 4B are circuit diagrams of power supply circuits for starters according to a second embodiment of the present invention.

In this embodiment, as shown in FIG. 4A, a capacitor 11 is connected in parallel with the starter motor 2 so that the speed of rise of the current supplied to the starter motor 2 is slowed down by the capacitance.

Figure 4B:
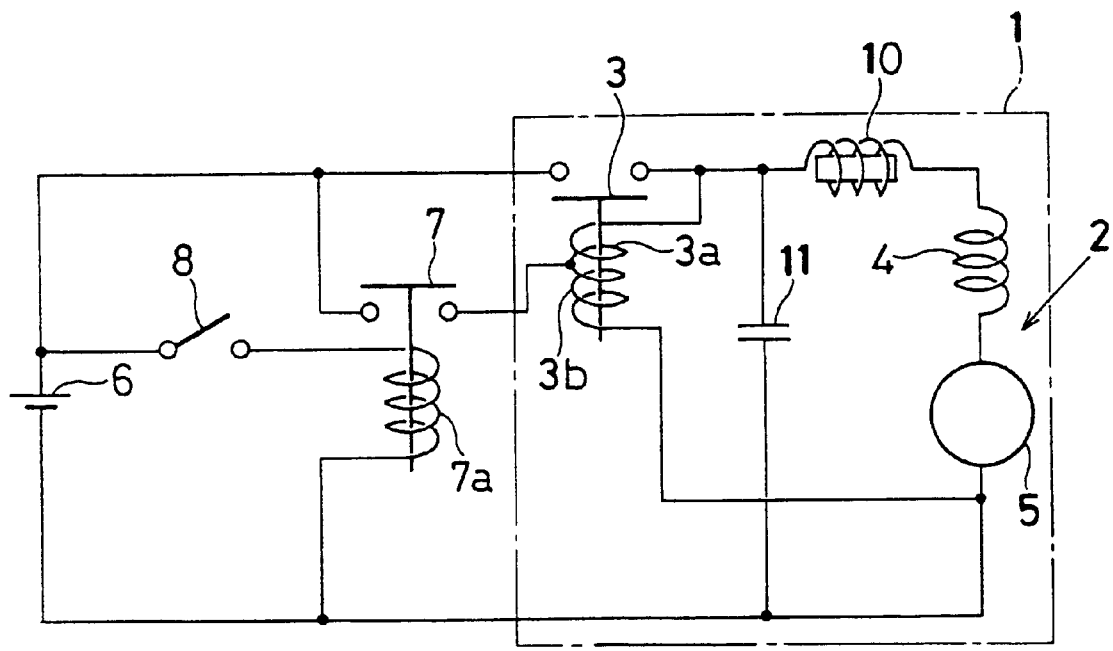
Figure 5:
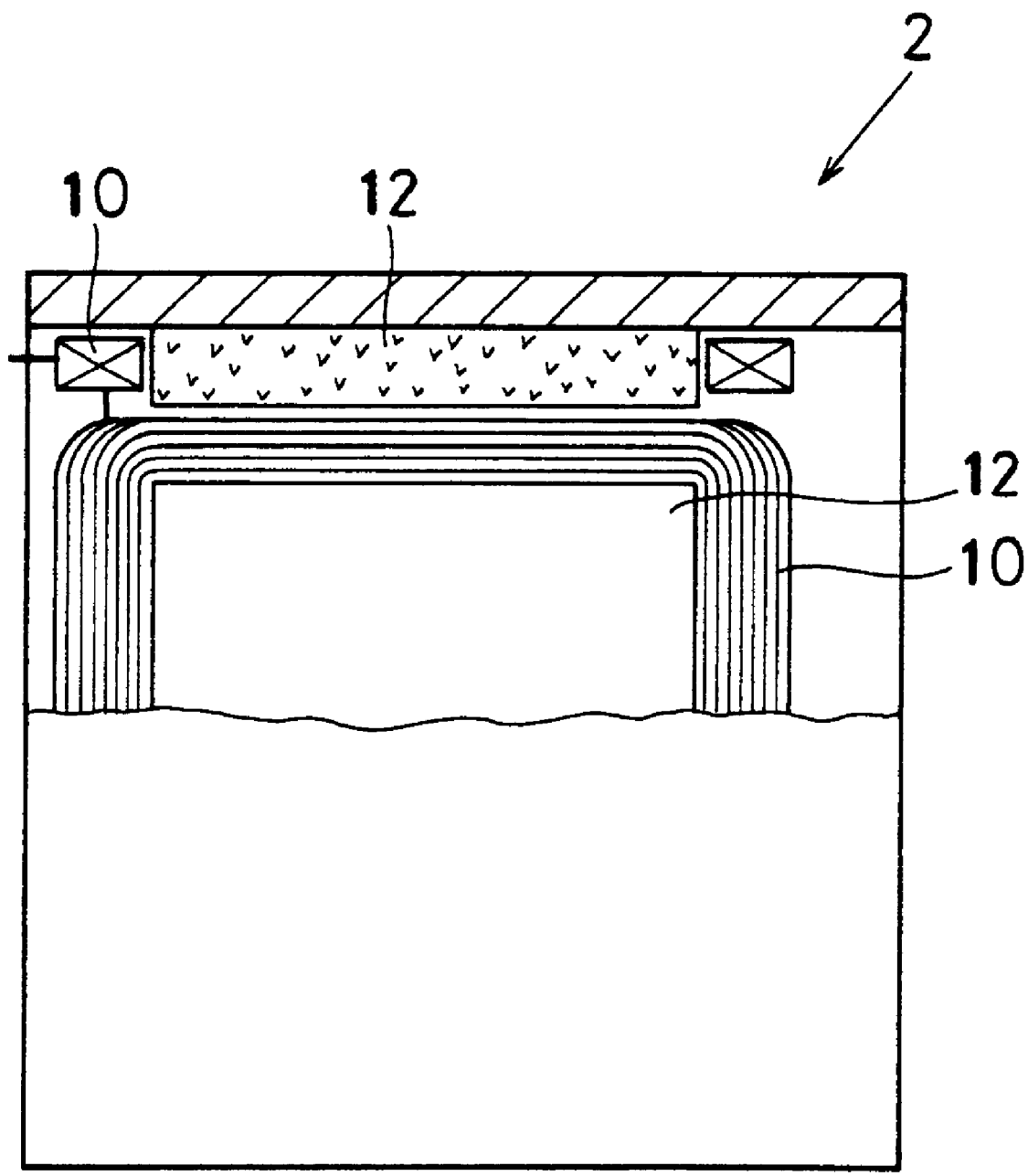
FIG. 5 is a schematic view of a stator of a starter motor used in a third embodiment of the present invention.

The second embodiment may be combined with the above first embodiment. That is, as shown in FIG. 4B, the inductance coil 10 is connected in series with the starter motor 2 and the capacitor 11 is connected in parallel with the starter motor 2. The inductance and the capacitance may be set small. In this instance, noise is more suppressed because an LC filter is formed by the inductance coil 10 and the capacitor 11.

Third Embodiment

In this embodiment, which may be applied to the first and second embodiments, the inductance coil 10 is would around permanent magnets 12 mounted on the stator of the starter motor 2. That is, the permanent magnet 12 of the starter motor 2 is also used as the iron core of the inductance coil 10. In this instance, the starter 1 having the inductance coil 10 can be sized small and made in light-weight thus reducing costs, because the permanent magnet 12 is shared by the inductance coil 10 and the starter motor 2.

Variation

The above embodiments are directed to cases in which the starter 1 is driven by manipulation of the key switch 8. However, an electronic control unit (ECU) may be provided separately from the key switch 8 to drive the starter 1. That is, the present invention may be applied to the economy running system, in which the magnet switch 3 is controlled by the ECU to automatically start driving the starter 1 for restarting the engine from the rest condition.

What is claimed is:

1. A current supply circuit for starters, comprising:
a starter motor, having a coil, for starting an engine;
a magnet switch, having a plunger, for turning on and off a current supplied to the starter motor and a magnet switch coil for driving the plunger; and
rise slow-down means connected to the starter motor for slowing down a speed of rise of the current supplied to the starter motor, wherein the rise slow-down means includes an inductance coil connected in series with the starter motor to slow down the speed of rise of the current supplied to the starter motor, and the inductance coil is provided separately from the stator motor coil and the magnet switch coil.

2. The current supply circuit for starters according to claim 1, wherein the starter motor has a permanent magnet and the inductance coil is wound around the permanent magnet.

3. A current supply circuit for starters, comprising:

a starter motor for starting an engine;

a magnet switch, having a plunger, for turning on and off a current supplied to the starter motor and a magnet switch coil for driving the plunger; and rise slow-down means connected to the starter motor for slowing down a speed of rise of the current supplied to the starter motor, wherein the rise slow-down means includes a capacitor connected in parallel with the starter motor to slow down the speed of rise of the current supplied to the starter motor and the capacitor is connected in parallel with the coil of the magnet switch.

4. A current supply circuit for starters, comprising:

a starter motor for starting an engine;

a magnet switch for turning on and off a current supplied to the starter motor; and rise slow-down means connected to the starter motor for slowing down a speed of rise of the current supplied to the starter motor, wherein a time period for slowing down the current supplied to the starter motor by the rise slow-down means increases in proportion to an increase in inductance of a coil of the magnet switch.

5. A current supply circuit for starters, comprising:

a starter motor for starting an engine;

a magnet switch for turning on and off a current supplied to the starter motor; and rise slow-down means connected to the starter motor for slowing down a speed of rise of the current supplied to the starter motor, wherein a time period required for the current supplied to the starter motor to attain a peak when the current supplied to the starter motor is slowed down by the rise slow-down means satisfies $T \leq (10/12)$ V, with T indicating the time period and V indicating a driving voltage for the starter motor.

6. A current supply circuit for starters, comprising:

a starter motor for starting an engine;

a magnet switch for turning on and off a current supplied to the starter motor; and rise slow-down means connected to the starter motor for slowing down a speed of rise of the current supplied to the starter motor, wherein the magnet switch includes a pull-in coil and a holding coil, and including an inductance coil provided separately from the pull-in coil, and the pull-in coil and the inductance coil are connected in series with the starter motor so that the current to the starter motor is supplied through the pull-in coil and the inductance coil at an initial stage of driving the starter motor.

* * * * *